United States Patent
Gowda

(10) Patent No.: US 11,797,794 B2
(45) Date of Patent: Oct. 24, 2023

(54) TECHNOLOGIES FOR PROVIDING MEDIA CONTROL DEVICE QUICK RESPONSE (QR) CODE FUNCTIONALITY

(71) Applicant: ARRIS Enterprises LLC, Suwanee, GA (US)

(72) Inventor: Sunil Kumar Puttaswamy Gowda, Karnataka (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/487,606

(22) Filed: Sep. 28, 2021

(65) Prior Publication Data

US 2022/0129652 A1    Apr. 28, 2022

Related U.S. Application Data

(60) Provisional application No. 63/106,068, filed on Oct. 27, 2020.

(51) Int. Cl.
  *G06K 7/10*   (2006.01)
  *G06K 7/14*   (2006.01)
  *H04L 67/306* (2022.01)

(52) U.S. Cl.
  CPC ....... *G06K 7/10722* (2013.01); *G06K 7/1417* (2013.01); *H04L 67/306* (2013.01)

(58) Field of Classification Search
  CPC . G06K 7/10722; G06K 7/1417; H04L 67/306
  See application file for complete search history.

(56) References Cited

U.S. PATENT DOCUMENTS

2007/0027964 A1*  2/2007  Herrod ............... H04L 41/0889
                                                     709/220
2008/0250122 A1* 10/2008  Zsigmond ........... H04L 12/2807
                                                     709/220

(Continued)

FOREIGN PATENT DOCUMENTS

CN        105451055 A      3/2016
CN        106792201 A      5/2017

OTHER PUBLICATIONS

Notification of Transmittal of the International Search Report (Forms PCT/ISA/220 and PCT/ISA/210) and the Written Opinion of the International Searching Authority (Form PCT/ISA/237) dated Jan. 20, 2022, by the International Application Division Korean Intellectual Property Office in corresponding International Application No. PCT/US2021/052319. (10 pages).

*Primary Examiner* — Laura A Gudorf
(74) *Attorney, Agent, or Firm* — Panitch Schwarze Belisario & Nadel LLC

(57) ABSTRACT

Technologies are disclosed for managing one or more quick response (QR) code-based media control device functions, such as configuring one or more consumer profiles related to the media control device. A QR code may be scanned, for example using a camera in communication with the media control device. The camera device may be integrally mounted with the media control device, or remotely mounted from the media control device. The media control device may interpret information conveyed by the QR code. One or more parameters for one or more consumer profiles for use on the media control device may be ascertained, perhaps for example based, at least in part, on the information. The media control device may configure at least a first consumer profile, perhaps for example using, at least in part, the one or more parameters. The first consumer profile may be implemented on the media control device.

23 Claims, 5 Drawing Sheets

(56) References Cited

U.S. PATENT DOCUMENTS

| | | | |
|---|---|---|---|
| 2014/0040941 A1* | 2/2014 | Rosenberg | H04N 21/4758 235/494 |
| 2014/0282807 A1* | 9/2014 | Joseph | H04L 65/611 725/132 |
| 2015/0113557 A1 | 4/2015 | Kim et al. | |
| 2015/0244715 A1 | 8/2015 | Narayan et al. | |
| 2016/0212613 A1 | 7/2016 | Huang | |

* cited by examiner

TECHNOLOGIES FOR PROVIDING MEDIA CONTROL DEVICE QUICK RESPONSE (QR) CODE FUNCTIONALITY

BACKGROUND

Media content (e.g., a form of more general electronic content) may be provided by a plurality of media content network operators to home and/or business subscribers/viewers. Media content network operators (e.g., cable network operators, or satellite operators, etc.) may provide subscribers/viewers with various forms of media content, such as movies, concerts, advertisements, premium media content, broadcast media content, and/or pay-per-view (PPV) media content, and/or the like.

Media content network operators deploy consumer premises equipment (CPE) in residential and/or commercial environments, among other consumer environments, as part of the media content delivery network. The various CPE devices are activated and/or configured based on a variety of factors, such as consumer identities, subscriptions, and/or preferences, etc.

CPE device activations and/or configurations may be conducted where/when a consumer desires a new, relocated, and/or updated media content delivery service. CPE device activations and/or configurations may be conducted as part of CPE device troubleshooting, and/or when/where CPE devices are replaced, perhaps for maintenance purposes, among other reasons. Often such activation/configuration requires manual input from the consumer, which can be tedious.

The present disclosure is directed toward overcoming one or more of the above-identified problems, although not necessarily limited to embodiments that do.

SUMMARY

Technologies are disclosed for managing quick response (QR) code-based media control device functions that may be related to communication of electronic content via a media control device, for example, among other devices. The media control device may be a set-top box, a home gateway, a mobile device, a media gateway, a television, and/or a personal computing device, among others, for example.

One or more consumer profiles related to the media control device may be configured using a QR code, for example. The media control device may scan a quick QR code, perhaps for example, using a camera device that may be in communication with the media control device. The media control device may interpret information conveyed by the QR code. One or more parameters for one or more consumer profiles for use on the media control device may be ascertained by the media control device, perhaps for example, based at least in part, on the information. At least a first consumer profile may be configured on the media control device, perhaps for example using, at least in part, the one or more parameters. The first consumer profile may be implemented on the media control device.

In one or more scenarios, the one or more parameters may correspond to the first consumer profile. The one or more parameters may include an email address, a telephone number, a consumer name, a service address, a billing address, a basic content subscription type, a premium content subscription type, a security code, a parental code, a consumer identification, a telephone caller identification service activation code, a content service activation code, a content service change code, and/or a media control device identification, for example.

In one or more scenarios, the QR code that may be scanned by the camera device may be received by the media control device. The camera device may be integrally mounted with the media control device, or the camera device may be remotely mounted from the media control device.

In one or more scenarios, the media control device may initiate its configuration and/or may initiate performance of one or more methods at least once, perhaps for example, at a time proximate to the receipt of the scanned QR code.

In one or more scenarios, the media control device may configure at least a second consumer profile, perhaps for example, using at least in part, the one or more parameters. The media control device may implement the second consumer profile on the media control device.

In one or more scenarios, the media control device may be in communication with a network services provider. The media control device may ascertain a validity status of the QR code with the network services provider. The validity status of the QR code may be valid, or invalid, for example.

In one or more scenarios, the QR code may be a first QR code and the media control device may be configured to provide electronic content. The media control device may provide electronic content including at least one advertisement. The media control device may receive an input that may correspond to a request for a second QR code. The second QR code may include information corresponding to the at least one advertisement. The media control device may provide the second QR code in a scannable form, for example.

In one or more scenarios, the media control device may send an indication to the network services provider. The indication may correspond to a number of requests for the second QR code, and/or to a number of scans of the QR code, for example.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
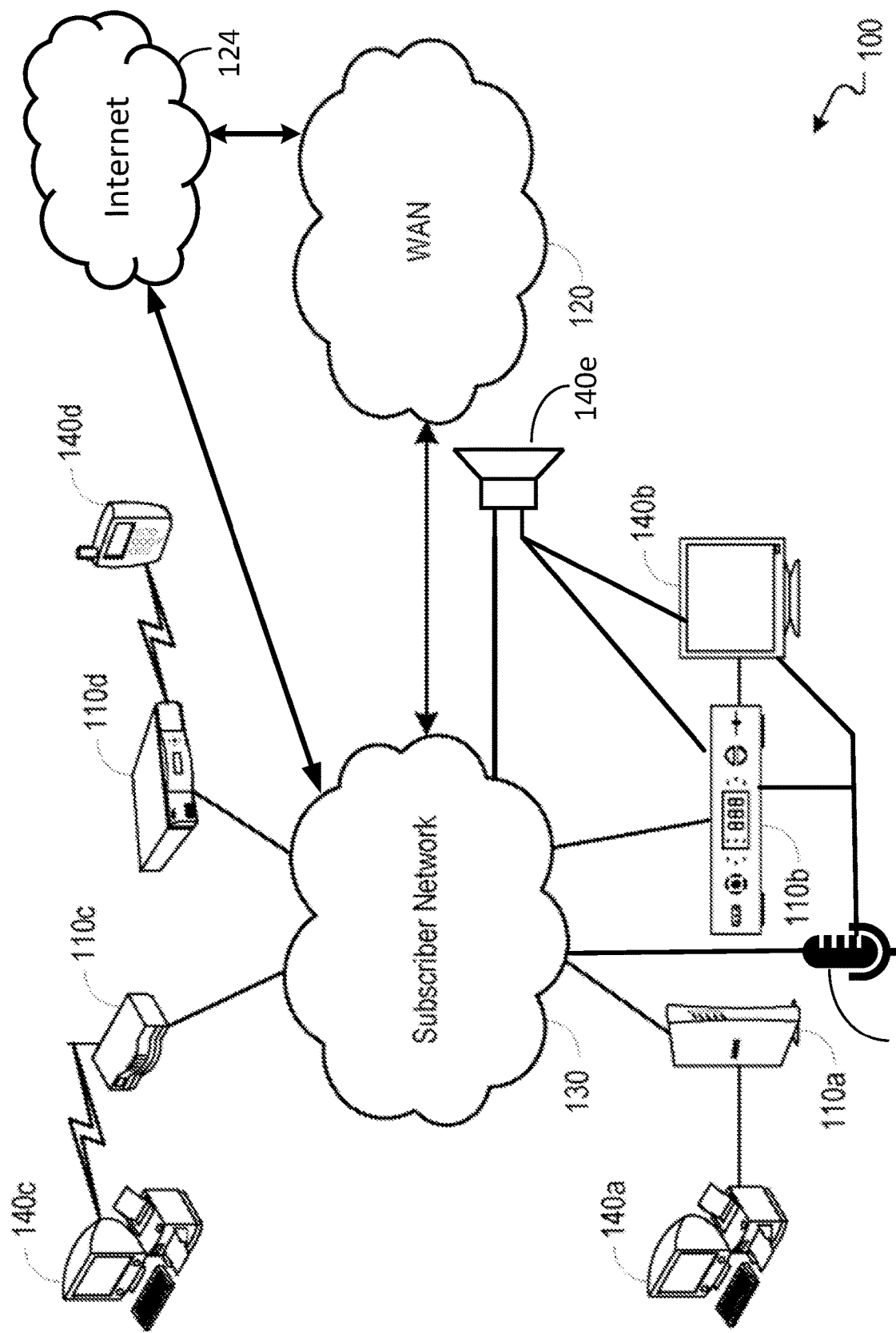
FIG. 1 is a block diagram illustrating an exemplary network environment operable to deliver electronic content throughout the network via one or more network devices, such as a consumer premises device (CPE) device, among other devices.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

FIG. 1 is a block diagram illustrating an exemplary network environment 100 operable for electronic content delivery. Electronic content may include media content, electronic documents, device-to-device communications, Internet/cloud-based electronic applications/services/databases, electronic communications/services, Internet-based electronic services, electronic commerce, video components/elements of electronic content, and/or audio components/elements of electronic content, among other types of electronic content.

A media content delivery network operator, or MSO, may deliver media content to subscribers/viewers. Media content may be provided via a consumer premise equipment (CPE) and/or network gateway device supported by the MSO, for example. In one or more scenarios, CPE devices 110a-d receive video service(s) and/or data service(s) from a wide area network (WAN) 120 via a connection to a subscriber network 130. The one or more nodes of subscriber network 130 and/or the WAN 120 may communicate with one or more cloud-based nodes (not shown) via the Internet 124. The subscriber network 130 and/or WAN 120 may include a home gateway (not shown), that may be used to implement set-top box functionality, among other functions.

The CPE devices can include, for example, a modem 110a, a set-top box 110b, a wireless router including an embedded modem 110c, or a media gateway 110d, among many others (e.g., digital subscriber line (DSL) modem, voice over internet protocol (VOIP) terminal adapter, video game console, digital versatile disc (DVD) player, communications device, hotspot device, etc.). The subscriber network 130, for example, can be a hybrid fiber-coaxial (HFC) network, a local area network (LAN), a wireless local area network (WLAN), a cellular network, a personal area network (PAN), as well as others.

The CPE devices can facilitate communications between the WAN 120 and client devices 140a-f A cable modem or embedded MTA (eMTA) 110 a can facilitate communications between the WAN 120 and a computer 140a. A set-top box 110b can facilitate communications between the WAN 120 and a television/monitor 140b (e.g., a media presentation device) and/or a digital video recorder (DVR). A wireless router 110c can facilitate communications between a computer 140c and the WAN 120. The media gateway 110d can facilitate communications between a mobile device 140d (e.g., a tablet computing device, a smartphone, a personal digital assistant (PDA) device, a laptop computing device, etc.; one or more devices being PC-based, iOS-based, Linux-based, and/or Android-based, etc.) and the WAN 120. One or more speaker devices (e.g., sound radiation devices/systems) 140e may be in communication with the Subscriber Network 130, set-top box 110b, and/or television 140b, etc.

The one or more speaker devices 140e (e.g., surround sound speakers, home theater speakers, other external wired/wireless speakers, loudspeakers, full-range drivers, subwoofers, woofers, mid-range drivers, tweeters, coaxial drivers, etc.) may broadcast at least an audio component of electronic content/media content, among other audio signals/processes/applications. The one or more speaker devices 140e may possess the capability to radiate sound in pre-configured acoustical/physical patterns (e.g., a cone pattern, a directional pattern, etc.)

One or more microphone devices 140f may be external/standalone microphone devices. The one or more microphone devices 140f may be in communication with the Subscriber Network 130, set-top box 110b, and/or television 140b, etc. Any of the client devices 140a-e may include internal microphone devices. The one or more speaker devices 140e (e.g., "speakers") and/or the one or more microphone devices 140f (e.g., "microphones") may have wired and/or wireless connections (e.g., Bluetooth, Wi-Fi, private protocol communication network, etc.) to any of the other devices 140a-140d, the Subscriber Network 130, the WAN 120, and/or the Internet 124.

A user (not shown) may monitor (e.g., watch and/or listen to) media content and/or more generally interact with various kinds of electronic content on/from/via one or more of the devices 110a-110d and/or 140a-140d, among other devices (not shown), for example. The electronic content may be encrypted via one or more encryption techniques, such as symmetrical and/or asymmetrical encryption. Any of the devices 110a-110d and/or 140a-140d may utilize one or more digital certificates to initiate, and/or engage in, encrypted communication to obtain, interact, and/or monitor electronic content that may be conveyed via the Internet 124, the WAN 120, and/or the Subscriber Network 130, etc., for example.

For example, a CPE device, such as a set-top box 110b and/or any of the devices 110a-110d and/or 140a-140b, may be used to receive service from a network services provider. For various reasons, perhaps for example when a consumer engages a network services provider for a new/fresh service and/or a change in an existing service, and/or perhaps when a CPE device may be replaced (e.g., for maintenance, upgrade, etc.), one or more consumer profiles may be implemented on the CPE device (e.g., may need to be implemented).

In one or more scenarios, the one or more profiles may be configured by the consumer (e.g., perhaps in cooperation with the network services provider) for implementation on a CPE device. A consumer may use one or more various forms of "manual entry" and/or "manual electronic entry" to input the one or more parameters that may complete a profile and/or profiles (e.g., perhaps the consumer may a personal profile and a business profile, or multiple members of a business or family may have their own profiles, etc.).

In one or more scenarios, using one or more quick response (QR) codes and/or their associated functionality may at least facilitate the consumer's efforts in creating the one or more profiles for implementation, among providing other useful features/functions.

In one or more scenarios, QR codes may be a type of barcode (e.g., a two-dimensional barcode). A barcode is a machine-readable (e.g., optically) label that may contain information about an associated item (e.g., a product, an advertisement, a service, and/or a subscription, etc.). QR codes may contain various kinds of information and/or code, including for example, instructions for initiating one or more applications; tracking information, activity, and/or sources; and/or for locating one or more Internet websites; among other information.

QR codes may appear in the form of one or more black squares arranged in a square grid on a white background. QR codes may be read/scanned by imaging devices, for example camera devices 460 and/or 560 (see FIGS. 4-5), among other imaging devices. The information conveyed by QR codes may be extracted/interpreted from the patterns that may be present in horizontal components and/or vertical components of the QR codes.

Using current methods and/or devices, customers/consumers of network services providers create the one or more consumer profiles on various media control devices (e.g., set-top boxes) by manually entering information. Technologies that may provide for easier, more accurate, and/or speedier entry of consumer profile information for media control devices may be useful. Capabilities, techniques, methods, and/or devices described herein may at least facilitate the implementation of one or more consumer profiles on media control devices, for example.

The WAN network 120 and/or the subscriber network 130 may be implemented as any type of wired and/or wireless network, including a local area network (LAN), a wide area network (WAN), a global network (the Internet), etc. Accordingly, the WAN network 120 and/or the subscriber network 130 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, computing devices, and/or storage devices, etc.

Figure 2:
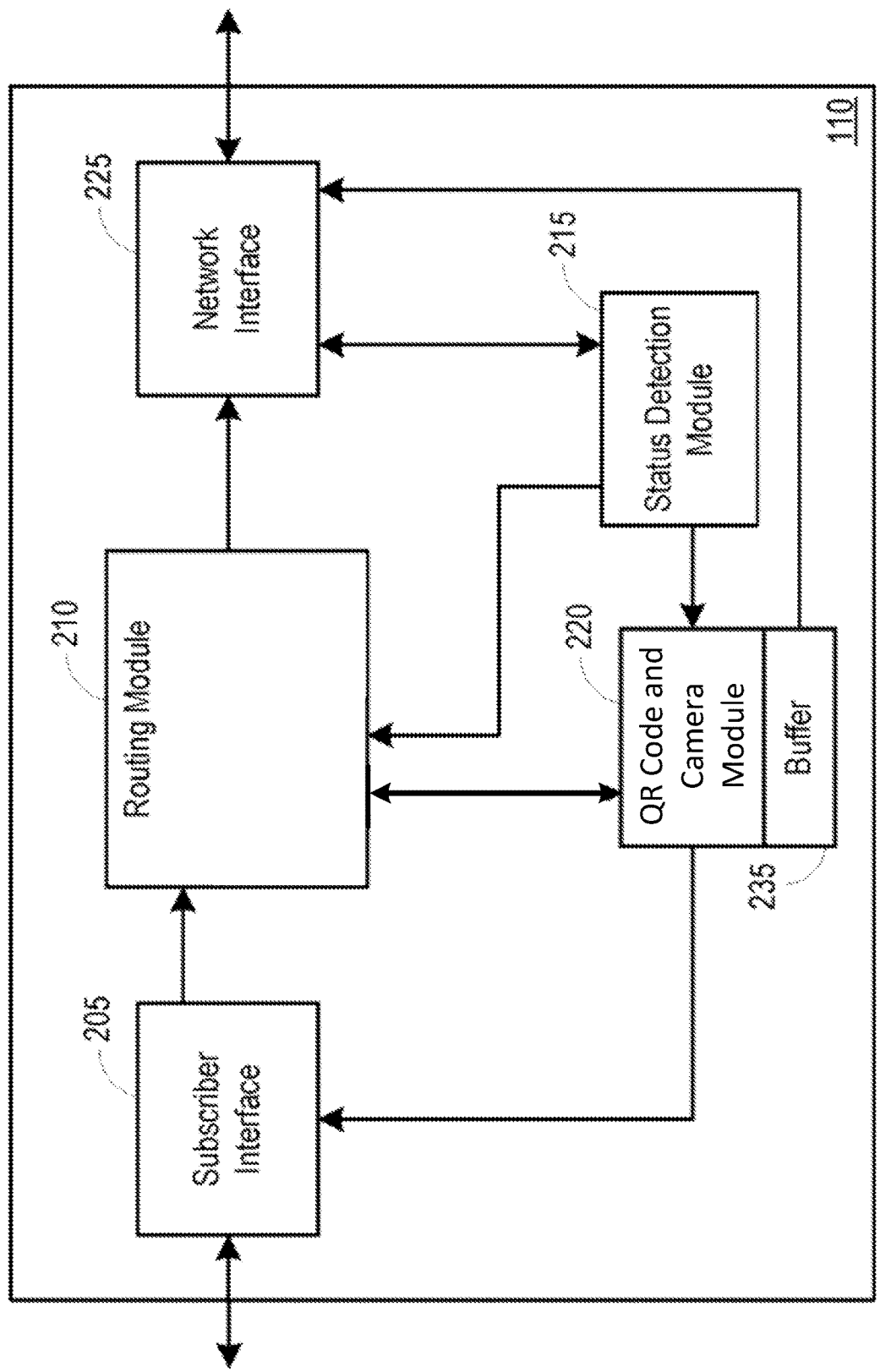
FIG. 2 is a block diagram illustrating an example CPE device of FIG. 1 that may be configured to deliver electronic content to a subscriber.

FIG. 2 is a block diagram illustrating an exemplary CPE device 110 (e.g., any of the devices 110a-110d) operable to output audio/visual electronic content/media content to one or more devices, such as for example, the television/monitor 140b, mobile device 140d, computer 140c, computer 140a, one or more speaker devices 140e, and/or one or more microphone devices 140f, etc. The CPE device 110 can include a subscriber interface 205, a routing module 210, a status detection module 215, a QR code and camera module 220, and/or a network interface 225.

In one or more scenarios, the CPE device 110 may receive a communication from a subscriber or subscriber device (e.g., subscriber device 140a-f of FIG. 1). For example, the communication can be a request for data and/or a service from a network (e.g., WAN 120 of FIG. 1). A communication received from a subscriber or subscriber device can be received as a resource identifier (e.g., URL, and/or an IP address, and/or other formats).

In one or more scenarios, a routing module 210 may route a received communication to a network interface 225. The routing module 210 may route the communication to the network interface 225. The routing module may translate the received communication from a URL to an IP address.

In one or more scenarios, a media control device (e.g., set-top box 110b and/or any of the devices 110a-110d and/or 140a-140b) and/or its QR code and camera module 220 may be configured to manage the functionality of one or more QR codes using the subject matter described herein. The one or more QR codes may be related to one or more profiles implemented on the media control device, and/or to one or more advertisements provided via the media control device, for example.

In one or more scenarios, the QR code and camera module 220 may be configured to manage one or more consumer profiles that may be used on/for the media control device. At least one QR code may be scanned, for example, by a camera device 460, 560 in communication with the media control device. The scanned QR code may be received by the media control device.

In one or more scenarios, the camera device 460, 560 may be integrally mounted (e.g., mounted inside, outside, or in otherwise in physical mounted connection with the media control device) with the media control device. In one or more scenarios, the camera device 460, 560 may be remotely mounted from the media control device (e.g., not physically mounted to the media control device) and/or may be in wired and/or wireless communication with the media control device.

The QR code and camera module 220 may be configured to interpret information conveyed by the QR code. One or more parameters may be ascertained for the one or more consumer profiles for use on the media control device, perhaps for example based, at least in part, on the information.

The QR code and camera module 220 may configure one or more (e.g., at least a first) consumer profiles, using at least in part, the one or more parameters. At least the first consumer profile may be implemented on the media control device.

In one or more scenarios, the one or more parameters may correspond to the first consumer profile, for example. The one or more parameters may include an email address, a telephone number, a consumer name, a service address, a billing address, a basic content subscription type (e.g., a group subscription, a level of subscription, etc.), a premium content subscription type (e.g., a group subscription, a level of subscription, etc.), a security code, a parental code, a consumer identification, a telephone caller identification service activation code, a content service activation code, a content service change code, and/or a media control device identification.

In one or more scenarios, the QR code and camera module 220 may be configured to initiate the performance of any or all of the subject matter described herein (e.g., capabilities, techniques, methods, and/or devices described herein) at least once, for example at a time proximate to the receipt of the scanned QR code, among other scenarios.

In one or more scenarios, the QR code and camera module 220 may be configured to configure at least a second consumer profile, perhaps, for example, using at least in part, the one or more parameters. The second consumer profile may be implemented on the media control device.

In one or more scenarios, the media control device may be in communication with a network services provider. The QR code and camera module 220 may be configured to ascertain a validity status of the QR code, perhaps for example, in cooperation with the network services provider. The validity status of the QR code may be valid, or invalid. The network services provider may communicate, for example via the media control device, that the QR code might not be valid and/or may be replaced, etc.

In one or more scenarios, the QR code may be provided by the network services provider electronically (via email/attachment, downloadable from website, etc.), via hardcopy mail, and/or with the transmittal of the CPE equipment, for example, among other scenarios. In whatever form the QR code may be provided, the QR code may be in scannable form for the QR code and camera module 220/media control device/camera device.

In one or more scenarios, the QR code may be specific for a particular media control device, or the QR code may be used with any or all media control devices associated with a consumer account, among other scenarios, for example.

In one or more scenarios, the QR code may be a "first" QR code, and/or the media control device may be configured to provide electronic content that may include at least one advertisement. The QR code and camera module 220 may be configured to receive an input. The input may correspond to a request for another QR code (e.g., a "second" QR code). The second QR code may include information corresponding to the at least one advertisement (e.g. a product, a service, etc.).

The QR code and camera module 220 may be configured to provide the second QR code in a scannable form (e.g., a visually interpretable form on the media control device and/or a television or monitor in communication with the media control device, etc.), and/or a form that may be imaged by an imaging device, such as a camera, among other devices, for example. The QR code and camera module 220 may be configured to send an indication to the network services provider, among other recipients, for example. The indication may correspond to a number of requests for the second QR code and/or to a number of scans of the QR code.

In one or more scenarios, the second QR code may be provided with the advertisement as a matter of course (e.g., automatically). In one or more scenarios, the QR code and camera module 220 may be configured to receive the input for the second QR code to indicate the consumer's interest in viewing/scanning the second QR code. The QR code and camera module 220 may be configured to provide the second QR code upon receipt of the input, for example, among other scenarios.

In one or more scenarios, the QR codes described herein may include information that provides a source identification of the QR code. For example, the second QR code may include information that provides a tracking/traceability that the second QR code may have been provided by a first network services provider. For example, in scenarios where the second QR code may be scanned by a mobile device associated with a second network services provider, the second QR code may include information that informs a website identified by the second QR code that the second QR code sourced from the first network services provider.

In one or more scenarios, the information corresponding to the at least one advertisement may include one or more of: a category of the at least one advertisement, information regarding a subject matter of the at least one advertisement, a consumer rating of the subject matter of the at least one advertisement, pricing of the subject matter of the at least one advertisement, at least one address of an Internet location/website corresponding to the subject matter of the at least one advertisement, and/or a hypertext-formatted link to at least one Internet location/website from which the subject matter of the at least one advertisement may be procurable, among other information, for example.

The routing module 210 can route communications, requests, determinations, and/or detections of QR code-based media control device functions by/for the QR code and camera module 220. For example, the routing module 210 can translate the communications, requests, determinations, and/or detections of QR code-based media control device functions into and/or with an address (e.g., IP address) associated with the QR code and camera module 220. The status detection module 215 may monitor the network connection status of the CPE device 110.

The status detection module 215 may ascertain the status of the network connection for the CPE device 110. The status detection module 215 can monitor the network connection of the CPE device 110 through the network interface 225. The status detection module 215 can monitor one or more various components that are associated with the network connection for the CPE device 110. For example, the status detection module 215 can monitor one or more hardware components (e.g., internal hardware components of the CPE device 110, connection cables such as radio frequency cables, phone lines, and/or digital subscriber lines, etc.) that may be used in the connection of the CPE device 110 to a network. This may include physical status detection (e.g., physical mapping to signal). Perhaps for example if no signal is detected, a physical component may be broken (e.g., broken line or disconnected plug, etc.), among other potential issues. A prompt can instruct a subscriber to check an associated connector and/or line.

The status detection module 215 can monitor the status of the network and/or data link layer(s) associated with the CPE device 110. For example, the status detection module 215 can monitor the CPE device's 110 connection to a host server (e.g., dynamic host configuration protocol server) and/or the status of configuration information received from the host server. For example, the status detection module 215 can monitor the CPE device's 110 connection to a packet routing server (e.g., a point-to-point protocol PPP server) and/or subscriber credentials such as a username and password associated with the packet routing server. Data link layer status may include failed (synchronization failure), connected, on-doing/on-going (synchronizing), and/or others. Perhaps, for example, in response to a failure, among other scenarios, a re-scan for a cable line and/or retraining for DSL line may be attempted.

The communications, requests, determinations, and/or detections of QR code-based media control device functions may be transmitted and/or stored in one or more files, such as text files (e.g., Hypertext Transfer Protocol (HTTP) files), among other type of files.

The CPE device 110 may store one or more, or multiple, files that may be ordered (e.g., hierarchically according to a specific order) for carrying out one or more actions in the setup of a device (e.g., set-top box 110*b*). The QR code and camera module 220 may include and/or be in communication with a buffer 235. The buffer 235 can store a subscriber communication (e.g., URL or IP address received from the subscriber) and/or the communications, requests, determinations, and/or detections QR code-based media control device functions.

In one or more scenarios, perhaps for example, when the status detection module 215 may determine that a network connection issue might no longer exist, the buffer 235 can output the subscriber communication and/or the communications, requests, determinations, and/or detections QR code-based media control device functions through the network interface 225.

In one or more scenarios, media content elements of the electronic content may include one or more of over-the-top (OTT) video, cable video, broadcast video, and/or satellite video, among other types of video content.

Figure 3:
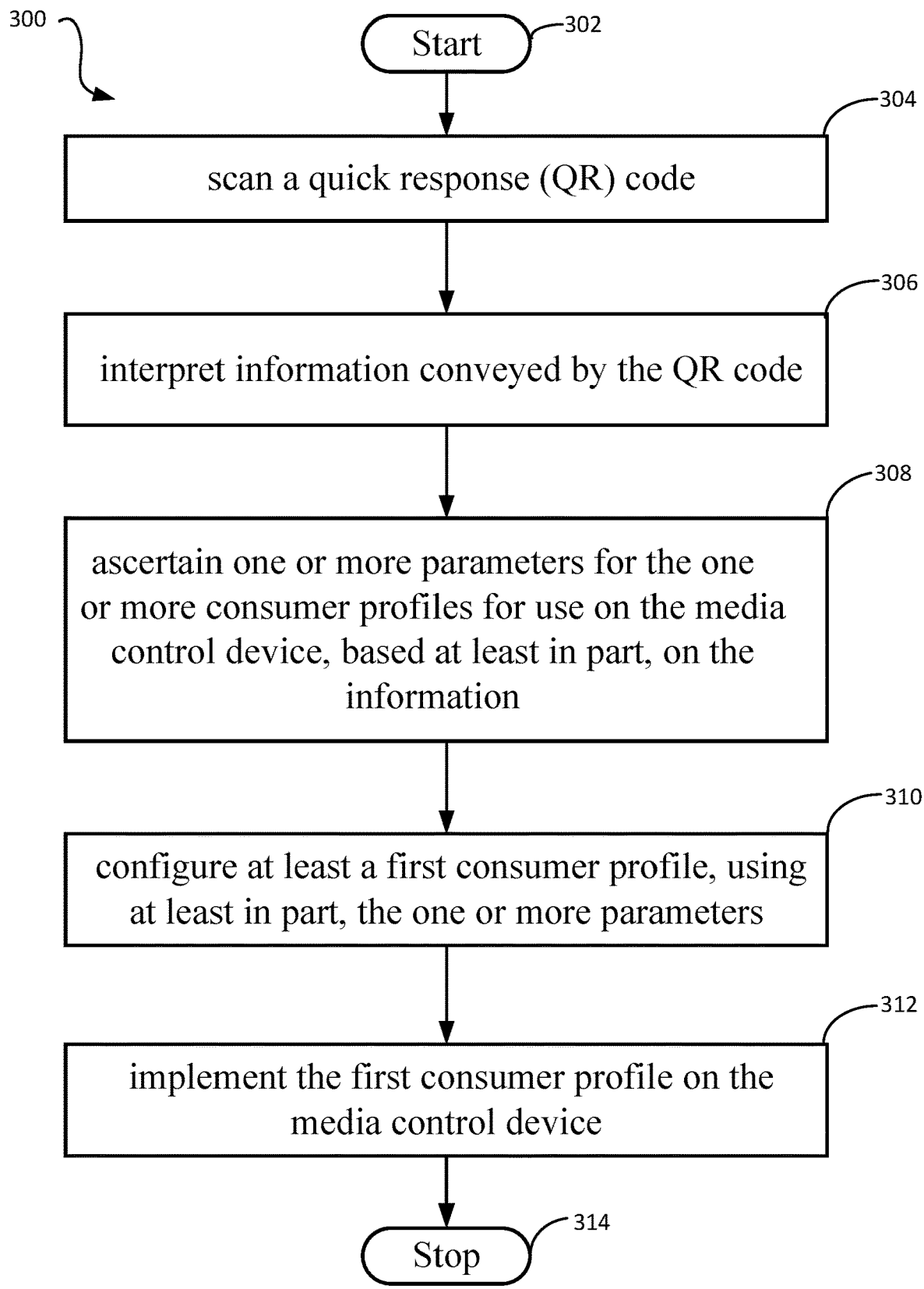
FIG. 3 is an exemplary flow diagram of at least one technique for managing one or more QR code-based media control device functions.

Referring now to FIG. 3, an exemplary diagram 300 illustrates a technique for managing one or more consumer profiles that may be related to a media control device, among other devices. For example, the media control device may be a set-top box such as device 110*b*, among other devices 110*a*-110*d* and/or 140*a*-140*d*. The media control device may be configured to provide electronic content and/or may be in communication with at least one network services provider. At 302, the process may start. At 304, the media control device may scan a quick response (QR) code.

At 306, the media control device may interpret information conveyed by the QR code. At 308, the media control device may ascertain one or more parameters for the one or more consumer profiles for use on the media control device, based at least in part, on the information.

At 310, the media control device may configure at least a first consumer profile, using at least in part, the one or more parameters. At 312, the media control device may implement the first consumer profile on the media control device.

At 314, the process may stop or restart. In one or more scenarios, the media control device may be a set-top box, a mobile device, a television, a personal computing device, a home gateway, and/or a media gateway, among other devices.

Figure 4:
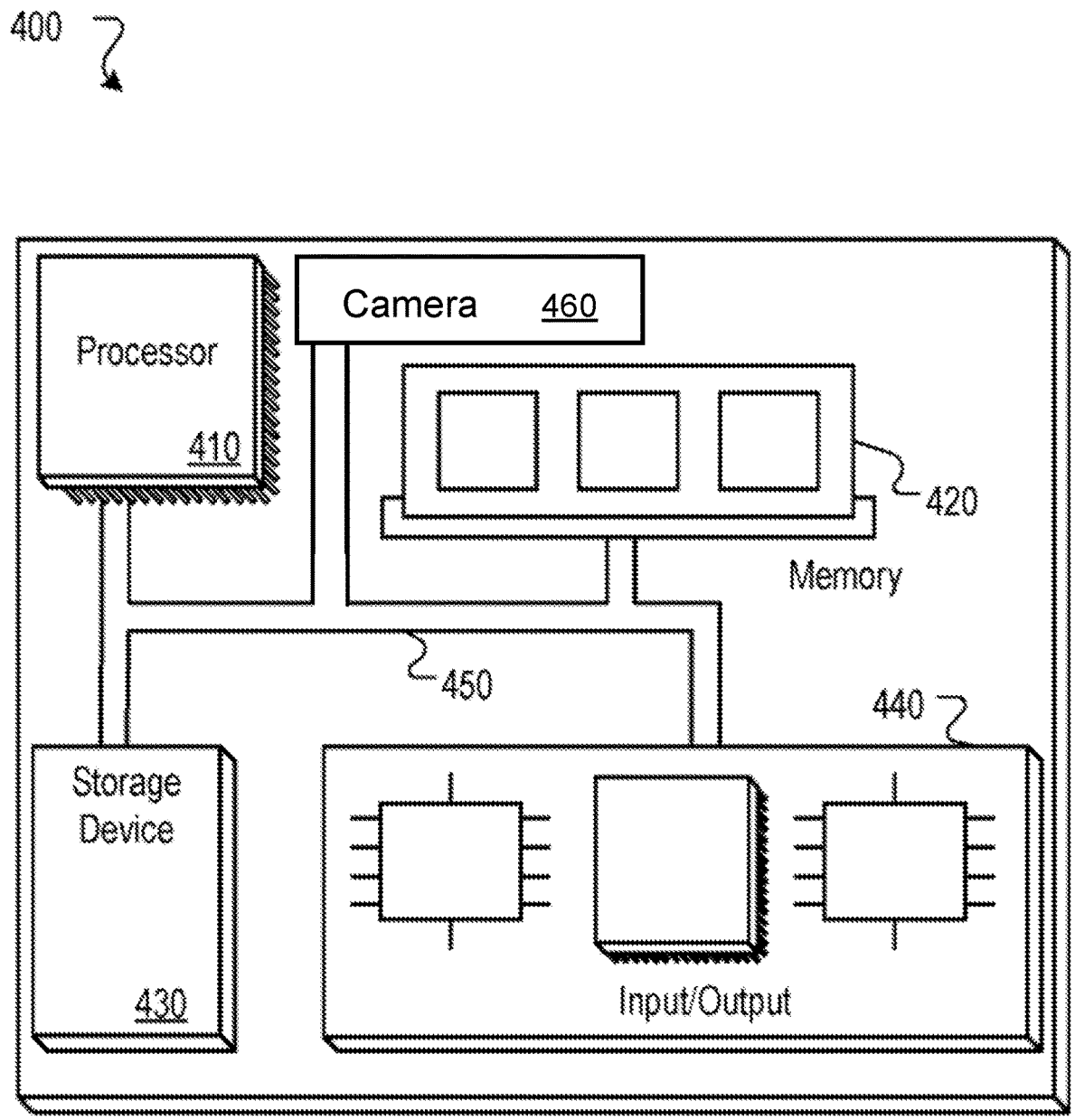
FIG. 4 is a block diagram of a hardware configuration of an exemplary device that may deliver electronic content, such as the CPE device of FIG. 2.

FIG. 4 is a block diagram of a hardware configuration of an exemplary device that may deliver electronic content/media content (e.g., video and/or audio content/components of electronic content), such as the CPE device 110 of FIG. 2, among other devices such as 140a-140d and/or 110a-110b, for example. The hardware configuration 400 may be operable to facilitate delivery of information from an internal server of a device. The hardware configuration 400 can include a processor 410, a memory 420, a storage device 430, and/or an input/output device 440. One or more of the components 410, 420, 430 and 440 can, for example, be interconnected using a system bus 450. The processor 410 can process instructions for execution within the hardware configuration 400. The processor 410 can be a single-threaded processor or the processor 410 can be a multi-threaded processor. The processor 410 can be capable of processing instructions stored in the memory 420 and/or on the storage device 430.

The memory 420 can store information within the hardware configuration 400. The memory 420 can be a computer-readable medium (CRM), for example, a non-transitory CRM. The memory 420 can be a volatile memory unit, and/or can be a non-volatile memory unit.

The storage device 430 can be capable of providing mass storage for the hardware configuration 400. The storage device 430 can be a computer-readable medium (CRM), for example, a non-transitory CRM. The storage device 430 can, for example, include a hard disk device, an optical disk device, flash memory and/or some other large capacity storage device. The storage device 430 can be a device external to the hardware configuration 400.

The input/output device 440 may provide input/output operations for the hardware configuration 400. The input/output device 440 (e.g., a transceiver device) can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). The input/output device can include driver devices configured to send communications to, and/or receive communications from one or more networks (e.g., subscriber network 120 of FIG. 1).

The camera device 460 may provide digital video input capability for the hardware configuration 400. The camera device 460 may communicate with any of the elements of the hardware configuration 400, perhaps for example via system bus 450. The camera device 460 may capture digital images and/or may scan images of various kinds, such as Universal Product Code (UPC) codes and/or Quick Response (QR) codes, for example, among other images.

The camera device 460 may also detect the presence of one or more people that may be proximate to the camera device 460 and/or may be in the same general space (e.g., the same room) as the camera device 460. The camera device 460 may gauge a general activity level (e.g., high activity, medium activity, and/or low activity) of one or more people that may be detected by the camera device 460. The camera device 460 may detect one or more general characteristics (e.g. height, body shape, skin color, pulse, heart rate, breathing count, etc.) of the one or more people detected by the camera device 460. The camera device 460 may be configured to recognize one or more specific people, for example.

The camera device 460 may be in wired and/or wireless communication with the hardware configuration 400. In one or more scenarios, the camera device 460 may be external to the hardware configuration 400. In one or more scenarios, the camera device 460 may be internal to the hardware configuration 400.

Figure 5:
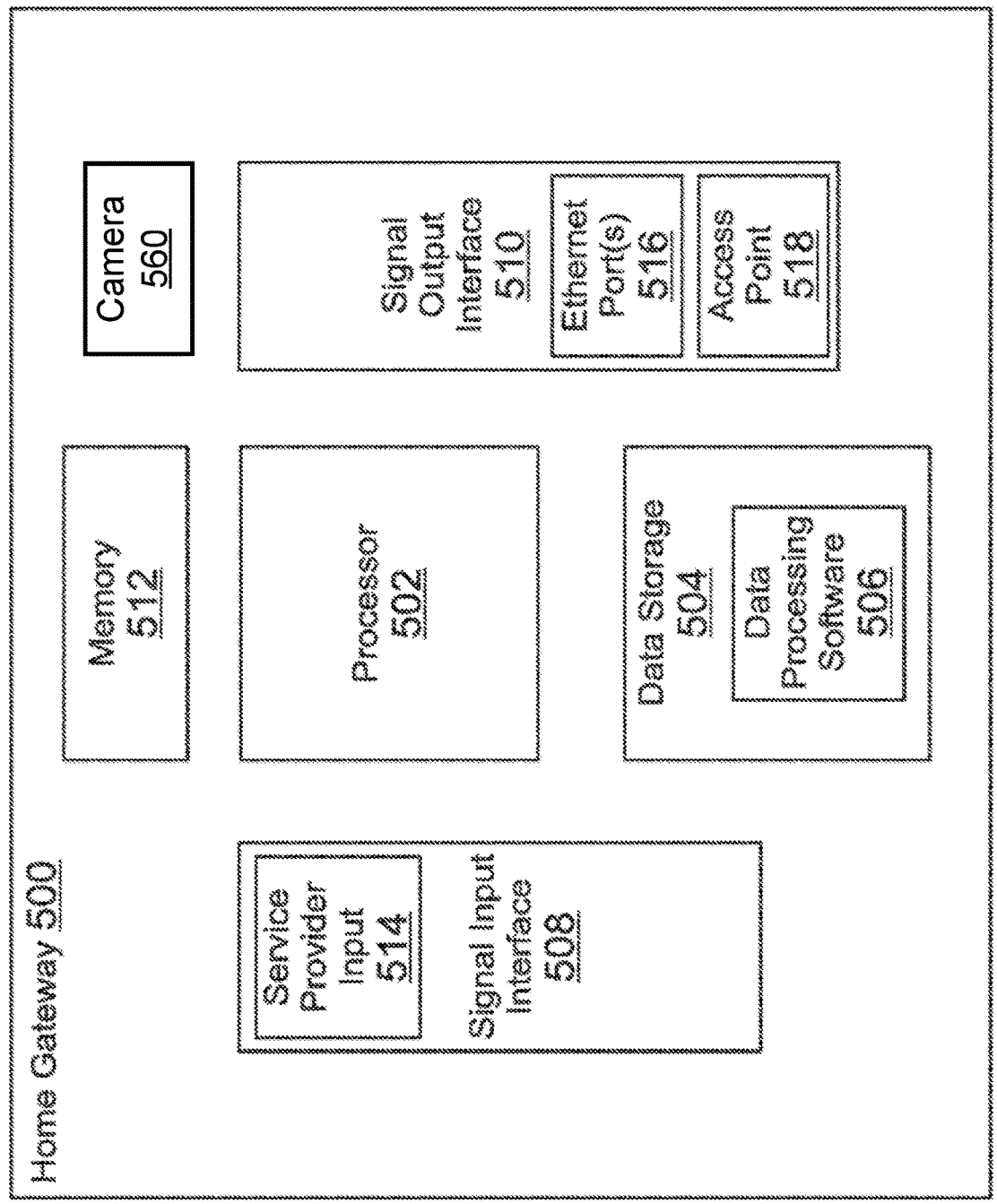
FIG. 5 is a block diagram of a hardware configuration of an example device that may deliver electronic content, such as a home gateway.

FIG. 5 is a block diagram of a hardware configuration of an exemplary device that may deliver electronic content/media content (e.g., video and/or audio components of electronic content), such as a home gateway (e.g., an access point device), among other devices. A hardware configuration 500 (e.g., home gateway 500) may be constructed in a similar manner to hardware configuration 400 in that the architecture may be built around a general-purpose processor, processor 502, and/or an application specific chip set such as designed for use in a Data Over Cable Service Interface Specification (DOCSIS), a Gigabit Passive Optical Network (GPON), and/or a Digital Subscriber Line (DSL) modem. As with processor 402, the general-purpose processor 502 may also be an off-the-shelf processor. The functionality of the desired modem may be implemented through data processing software 506 stored in data storage 504 and/or may be run on processor 502.

Home gateway 500 may include signal input interface 508 and/or signal output interface 510. Signal input interface 508 may include, for example, circuitry to receive data input from a service provider at service provider input 514, e.g., a cable and/or a fiber optic input.

Signal output interface 510 may provide the output of the home gateway 500. Signal output interface 510 may provide signals in formats for transmission over a datalink. For example, interface 510 may include one or more Ethernet ports 516 and/or a wireless access point 518. Data may be communicated over wired and/or wireless networks. The access point 518 may be located external to the home gateway 500. Video and/or audio content received at signal input interface 508 can be streamed from home gateway 500 to hardware configuration 400, perhaps for example as another source of video and/or audio signal. This streaming may be accomplished over a reliable backhaul communication link (not shown) that may provide good video quality, perhaps for example for signals that are sensitive to latency in the signal (e.g., live programming). The signal input interface 508 and the signal output interface 510 may operate together, such as for example as a transceiver device.

In operation, a data signal may be received at signal input interface 508 of home gateway 500. Processor 502 may operate data processing software 506 on general-purpose processor 502 to prepare the received signals (e.g., code, decode, etc.). The output of the data processing software 506 may be output by signal output interface 510, e.g., Ethernet port 516 and/or wireless access point 518.

The camera device 560 may provide digital video input capability for the home gateway 500. The camera device 560 may communicate with any of the elements of the home gateway 500. The camera device 560 may capture digital images and/or may scan images of various kinds, such as Universal Product Code (UPC) codes and/or Quick Response (QR) codes, for example, among other images.

The camera device 560 may also detect the presence of one or more people that may be proximate to the camera device 560 and/or may be in the same general space (e.g., the same room) as the camera device 560. The camera device 560 may gauge a general activity level (e.g., high activity, medium activity, and/or low activity) of one or more people that may be detected by the camera device 560. The camera device 560 may detect one or more general characteristics (e.g. height, body shape, skin color, pulse, heart rate, breathing count, etc.) of the one or more people detected by the camera device 560. The camera device 560 may be configured to recognize one or more specific people, for example.

The camera device 560 may be in wired and/or wireless communication with the home gateway 500. In one or more scenarios, the camera device 560 may be external to the home gateway 500. In one or more scenarios, the camera device 560 may be internal to the home gateway 500.

Those skilled in the art will appreciate that the disclosed subject matter improves upon methods and/or apparatuses for managing QR code-based media control device functions. For example, one or more consumer profiles for use with/on a media control device may be configured using a QR code that may be scanned by a camera in communication with the media control device. The information that may be provided via the scanned QR code may provide for the implementation of the one or more consumer profiles on the media control device. This may be useful in one or more scenarios, for example where a consumer may otherwise manually input information that may be provided via scanning the QR code, among other scenarios.

The subject matter of this disclosure, and components thereof, can be realized by instructions that upon execution cause one or more processing devices to carry out the processes and/or functions described herein. Such instructions can, for example, comprise interpreted instructions, such as script instructions, e.g., JavaScript or ECMAScript instructions, or executable code, and/or other instructions stored in a computer readable medium.

Implementations of the subject matter and/or the functional operations described in this specification and/or the accompanying figures can be provided in digital electronic circuitry, in computer software, firmware, and/or hardware, including the structures disclosed in this specification and their structural equivalents, and/or in combinations of one or more of them. The subject matter described in this specification can be implemented as one or more computer program products, e.g., one or more modules of computer program instructions encoded on a tangible program carrier for execution by, and/or to control the operation of, data processing apparatus.

A computer program (also known as a program, software, software application, script, or code) can be written in any form of programming language, including compiled or interpreted languages, and/or declarative or procedural languages. It can be deployed in any form, including as a stand-alone program or as a module, component, subroutine, and/or other unit suitable for use in a computing environment. A computer program may or might not correspond to a file in a file system. A program can be stored in a portion of a file that holds other programs and/or data (e.g., one or more scripts stored in a markup language document), in a single file dedicated to the program in question, and/or in multiple coordinated files (e.g., files that store one or more modules, sub programs, or portions of code). A computer program can be deployed to be executed on one computer or on multiple computers that may be located at one site or distributed across multiple sites and/or interconnected by a communication network.

The processes and/or logic flows described in this specification and/or in the accompanying figures may be performed by one or more programmable processors executing one or more computer programs to perform functions by operating on input data and/or generating output, thereby tying the process to a particular machine (e.g., a machine programmed to perform the processes described herein).

The processes and/or logic flows can also be performed by, and apparatus can also be implemented as, special purpose logic circuitry, e.g., an FPGA (field programmable gate array) and/or an ASIC (application specific integrated circuit).

Computer readable media suitable for storing computer program instructions and/or data may include all forms of non-volatile memory, media and memory devices, including by way of example semiconductor memory devices (e.g., EPROM, EEPROM, and/or flash memory devices); magnetic disks (e.g., internal hard disks or removable disks); magneto optical disks; and/or CD ROM and DVD ROM disks. The processor and/or the memory can be supplemented by, or incorporated in, special purpose logic circuitry.

While this specification and the accompanying figures contain many specific implementation details, these should not be construed as limitations on the scope of any invention and/or of what may be claimed, but rather as descriptions of features that may be specific to described example implementations. Certain features that are described in this specification in the context of separate implementations can also be implemented in combination in perhaps one implementation. Various features that are described in the context of perhaps one implementation can also be implemented in multiple combinations separately or in any suitable sub-combination. Although features may be described above as acting in certain combinations and/or perhaps even (e.g., initially) claimed as such, one or more features from a claimed combination can in some cases be excised from the combination. The claimed combination may be directed to a sub-combination and/or variation of a sub-combination.

While operations may be depicted in the drawings in an order, this should not be understood as requiring that such operations be performed in the particular order shown and/or in sequential order, and/or that all illustrated operations be performed, to achieve useful outcomes. The described program components and/or systems can generally be integrated together in a single software product and/or packaged into multiple software products.

Examples of the subject matter described in this specification have been described. The actions recited in the claims can be performed in a different order and still achieve useful outcomes, unless expressly noted otherwise. For example, the processes depicted in the accompanying figures do not require the particular order shown, and/or sequential order, to achieve useful outcomes. Multitasking and parallel processing may be advantageous in one or more scenarios.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A method for managing one or more consumer profiles related to a media control device configured to provide electronic content, wherein the media control device is in communication with a network services provider, the method comprising:
scanning a first quick response (QR) code, the first QR code containing user profile information;
interpreting, by the media control device, the user profile information conveyed by the first QR code;
ascertaining, by the media control device, one or more parameters for one or more consumer profiles for use on the media control device, based at least in part, on the user profile information;

configuring, by the media control device, at least a first consumer profile, using at least in part, the one or more parameters;

implementing, by the media control device, the first consumer profile on the media control device;

providing, by the media control device, electronic content, the electronic content including at least one advertisement;

receiving, by the media control device, an input corresponding to a request for a second QR code, the second QR code including information corresponding to the at least one advertisement;

providing, by the media control device, the second QR code in a scannable form; and sending an indication to the network services provider, the indication corresponding to at least one of: a number of requests for the second QR code, or a number of scans of the second QR code.

2. The method of claim 1, wherein the one or more parameters correspond to the first consumer profile, and the one or more parameters include at least one of: an email address, a telephone number, a consumer name, a service address, a billing address, a basic content subscription type, a premium content subscription type, a security code, a parental code, a consumer identification, a telephone caller identification service activation code, a content service activation code, a content service change code, or a media control device identification.

3. The method of claim 1, wherein the media control device is in communication with a camera device, and the scanning further comprises:

scanning, by the camera device, the first QR code; and receiving, by the media control device, the scanned first QR code, the camera device being at least one of: integrally mounted with the media control device, or remotely mounted from the media control device.

4. The method of claim 3, further comprising:

initiating, by the media control device, performance of the method at least once at a time proximate to the receiving the scanned first QR code.

5. The method of claim 1, wherein the method further comprises:

configuring, by the media control device, at least a second consumer profile, using at least in part, the one or more parameters; and implementing, by the media control device, the second consumer profile on the media control device.

6. The method of claim 1, the method further comprising:

ascertaining, by the media control device, a validity status of the first QR code with the network services provider, the validity status of the first QR code being at least one of: valid, or invalid.

7. The method of claim 1, wherein the information corresponding to the at least one advertisement includes one or more of: a category of the at least one advertisement, information regarding a subject matter of the at least one advertisement, a consumer rating of the subject matter of the at least one advertisement, pricing of the subject matter of the at least one advertisement, at least one address of an Internet location corresponding to the subject matter of the at least one advertisement, a hypertext formatted link to at least one Internet location from which the subject matter of the at least one advertisement is procurable.

8. The method of claim 1, wherein the media control device is at least one of: a set-top box, a home gateway, a mobile device, a media gateway, a television, or a personal computing device.

9. A media control device configured to provide electronic content, wherein the media control device is in communication with a network services provider, the device comprising:

a memory;

a transceiver; and a processor, the processor configured at least to:

scan a first quick response (QR) code, the first QR code containing user profile information;

interpret the user profile information conveyed by the first QR code;

ascertain one or more parameters for one or more consumer profiles for use on the media control device, based at least in part, on the user profile information;

configure at least a first consumer profile, using at least in part, the one or more parameters;

implement the first consumer profile on the media control device;

provide electronic content, the electronic content including at least one advertisement;

receive an input corresponding to a request for a second QR code, the second QR code including information corresponding to the at least one advertisement;

provide the second QR code in a scannable form; and send an indication to the network services provider, the indication corresponding to at least one of: a number of requests for the second QR code, or a number of scans of the second QR code.

10. The device of claim 9, wherein the processor is further configured such that the one or more parameters correspond to the first consumer profile, the one or more parameters including at least one of: an email address, a telephone number, a consumer name, a service address, a billing address, a basic content subscription type, a premium content subscription type, a security code, a parental code, a consumer identification, a telephone caller identification service activation code, a content service activation code, a content service change code, or a media control device identification.

11. The device of claim 9, wherein the device is in communication with a camera device, the processor being further configured to:

scan, via the camera device, the first QR code; and receive the scanned first QR code, the camera device being at least one of: integrally mounted with the media control device, or remotely mounted from the media control device.

12. The device of claim 11, wherein the processor is further configured to initiate execution of the configuration at least once at a time proximate to the receipt of the scanned first QR code.

13. The device of claim 9, wherein the processor is further configured to:

configure at least a second consumer profile, using at least in part, the one or more parameters; and implement the second consumer profile on the media control device.

14. The device of claim 9, the processor being further configured to:

ascertain a validity status of the first QR code with the network services provider, the validity status of the QR code being at least one of: valid, or invalid.

15. The device of claim 9, wherein the processor is further configured such that the information corresponding to the at least one advertisement includes one or more of: a category of the at least one advertisement, information regarding a subject matter of the at least one advertisement, a consumer rating of the subject matter of the at least one advertisement, pricing of the subject matter of the at least one advertisement, at least one address of an Internet location corresponding to the subject matter of the at least one advertisement, a hypertext formatted link to at least one Internet location from which the subject matter of the at least one advertisement is procurable.

16. The device of claim 9, wherein the device is at least one of: a set-top box, a home gateway, a media gateway, a mobile device, a television, or a personal computing device.

17. A non-transitory computer readable medium having instructions stored thereon, the instructions causing at least one processor of a media control device configured to provide electronic content to perform one or more operations, the media control device being in communication with a network services provider, the one or more operations comprising at least:
   scanning a first quick response (QR) code, the first QR code containing user profile information;
   interpreting the user profile information conveyed by the first QR code;
   ascertaining one or more parameters for one or more consumer profiles for use on the media control device, based at least in part, on the user profile information;
   configuring at least a first consumer profile, using at least in part, the one or more parameters;
   implementing the first consumer profile on the media control device;
   providing electronic content, the electronic content including at least one advertisement;
   receiving an input corresponding to a request for a second QR code, the second QR code including information corresponding to the at least one advertisement;
   providing the second QR code in a scannable form; and
   sending an indication to the network services provider, the indication corresponding to at least one of: a number of requests for the second QR code, or a number of scans of the second QR code.

18. The non-transitory computer readable medium of claim 17, wherein the one or more parameters correspond to the first consumer profile, and the one or more parameters include at least one of: an email address, a telephone number, a consumer name, a service address, a billing address, a basic content subscription type, a premium content subscription type, a security code, a parental code, a consumer identification, a telephone caller identification service activation code, a content service activation code, a content service change code, or a media control device identification.

19. The non-transitory computer readable medium of claim 17, wherein the media control device is in communication with a camera device, the one or more operations further comprising:
   scanning the first QR code by the camera device;
   receiving the scanned first QR code; and
   initiating performance of the one or more operations at least once at a time proximate to the receiving the scanned first QR code, the camera device being at least one of: integrally mounted with the media control device, or remotely mounted from the media control device.

20. The non-transitory computer readable medium of claim 17, wherein the one or more operations further comprise:
   configuring at least a second consumer profile, using at least in part, the one or more parameters; and
   implementing the second consumer profile on the media control device.

21. The non-transitory computer readable medium of claim 17, wherein the one or more operations further comprise:
   ascertaining a validity status of the first QR code with the network services provider, the validity status of the first QR code being at least one of: valid, or invalid.

22. The non-transitory computer readable medium of claim 17, wherein the information corresponding to the at least one advertisement includes one or more of: a category of the at least one advertisement, information regarding a subject matter of the at least one advertisement, a consumer rating of the subject matter of the at least one advertisement, pricing of the subject matter of the at least one advertisement, at least one address of an Internet location corresponding to the subject matter of the at least one advertisement, a hypertext formatted link to at least one Internet location from which the subject matter of the at least one advertisement is procurable, the camera device being at least one of: integrally mounted with the media control device, or remotely mounted from the media control device.

23. The non-transitory computer readable medium of claim 17, wherein the media control device is at least one of: a set-top box, a home gateway, a mobile device, a media gateway, a television, or a personal computing device.

* * * * *